(12) United States Patent
Haze (10) Patent No.: US 12,193,910 B2
(45) Date of Patent: Jan. 14, 2025

(54) DENTAL PROSTHESIS SYSTEM FOR IMPLANT SCREW ANCHOR

(71) Applicant: Robert Haze, Palmdale, CA (US)

(72) Inventor: Robert Haze, Palmdale, CA (US)

( * ) Notice: Subject to any disclaimer, the term of this patent is extended or adjusted under 35 U.S.C. 154(b) by 0 days.

(21) Appl. No.: 18/423,713

(22) Filed: Jan. 26, 2024

(65) Prior Publication Data

US 2024/0407891 A1 Dec. 12, 2024

Related U.S. Application Data (60) Provisional application No. 63/472,220, filed on Jun. 9, 2023.

(51) Int. Cl.
*A61C 8/00* (2006.01)

(52) U.S. Cl.
CPC .......... *A61C 8/0051* (2013.01); *A61C 8/0068* (2013.01); *A61C 2008/0084* (2013.01)

(58) Field of Classification Search
CPC ... A61C 8/0051; A61C 8/0068; A61C 8/0048; A61C 8/005; A61C 2008/0084
USPC ....................................... 433/173–176, 201.1
See application file for complete search history.

(56) References Cited

U.S. PATENT DOCUMENTS

| | | | |
|---|---|---|---|
| 2006/0105296 A1* | 5/2006 | Linder | A61C 8/005 433/173 |
| 2009/0111072 A1 | 4/2009 | Lombardo et al. | |
| 2012/0052464 A1* | 3/2012 | Ochenrider | A61C 8/005 433/174 |

FOREIGN PATENT DOCUMENTS

| | | |
|---|---|---|
| BR | PI0305311 B1 | 6/2004 |
| ES | 2264650 B1 | 1/2007 |
| JP | 3905556 B2 | 4/2007 |
| KR | 101173758 B1 | 8/2012 |
| RU | 2625280 C2 | 7/2017 |

OTHER PUBLICATIONS

"Pin on dental crown" Apr. 14, 2019, https://www.pinterest.com/pin/727049933573701853/. Retrieve from the Internet on Jan. 30, 2024.

(Continued)

*Primary Examiner* — Ralph A Lewis
*Assistant Examiner* — Mirayda A Aponte
(74) *Attorney, Agent, or Firm* — Command IP LLP; Pejman Yedidsion (57) ABSTRACT

Methods, systems, and devices including a dental prosthesis having: a dental implant adapted to be inserted inside a jawbone and defining an elongated cavity; an abutment adapted to be partially inserted inside the elongated cavity and defining an access hole aligned with the elongated cavity; a screw adapted to be inserted inside the elongated cavity and the access hole and coupling the abutment with the dental implant; and an anti-rotation bar disposed inside the access hole and having a first end engaged with a head of the screw and an outer surface disposed in contact with the abutment, wherein the anti-rotation bar restricts a rotation of the screw inside the access hole.

16 Claims, 11 Drawing Sheets

(56) References Cited

OTHER PUBLICATIONS

O'Brien Dental Labs, "Engaging vs. Non-Engaging Abutments" Aug. 20, 2019. [Retrieved from the Internet} https://obriendentallab.com/blog/xwm1hxy6ktql2kvytqxuvm11z2ujqb.Retrieved on Jan. 30, 2024.

Stanley II, Robert J., "A Simple Technique to Create Accurate, Esthetic Immediate Implant Provisional Restorations: Hurricane Anti-rotation Wings", Compendium Feb. 2023, vol. 44, Issue 2 https://www.aegisdentalnetwork.com/cced/2023/02/a-simple-technique-to-create-accurate-esthetic-immediate-implant-provisional-restorations-hurricane-anti-rotation-wings. [Retrieved rom the Internet} Jan. 30, 2024.

* cited by examiner

FIG. 7E

DENTAL PROSTHESIS SYSTEM FOR IMPLANT SCREW ANCHOR

CROSS-REFERENCE TO RELATED APPLICATION

This application claims priority to and benefit of Provisional Patent Application No. 63/472,220, filed Jun. 9, 2023, the contents of which are hereby incorporated by reference herein for all purposes.

TECHNICAL FIELD

Embodiments relate generally to a dental prosthesis, and more particularly to a dental prosthesis having an anti-rotation bar adapted to engage with a screw that couples a dental implant with an abutment to prevent a loosening of the screw.

BACKGROUND

The practice of dentistry involves fixing an artificial tooth in a patient mouth using a dental implant. Some of the apparent advantages include esthetic appearance, comfort, improved hygiene, osseous and gum preservation, versatility, preservation of adjacent teeth, relatively low maintenance and fewer long-term costs. For fixing the artificial tooth, the dental implant is surgically embedded into the patient's jawbone in the place of the missing tooth. The dental implant is, generally, screwed into a jawbone and functions as a tooth root substitute. Thereafter, an abutment including a crown that resembles a tooth is secured to the dental implant using a screw. However, over time, the screw, which holds down the implant-supported crown and abutment, may loosen due to external forces such as chewing and grinding forces, causing the relative movement between the dental implant and the abutment, and eventual failure of the prosthesis.

SUMMARY

A dental prosthesis according to one embodiment may include: a dental implant adapted to be inserted inside a jawbone and defining an elongated cavity; an abutment configured to be partially inserted inside the elongated cavity and defining an access hole aligned with the elongated cavity; a screw configured to be inserted inside the elongated cavity and the access hole and coupling the abutment with the dental implant; and an anti-rotation bar disposed inside the access hole and having a first end engaged with a head of the screw and an outer surface disposed in contact with the abutment, wherein the anti-rotation bar restricts a rotation of the screw inside the access hole.

In one embodiment of the dental prosthesis, the anti-rotation bar may comprise: a bar extending in a longitudinal direction and having a first end arranged abutting the head of the screw; and a cover arranged surrounding the bar and disposed in engagement with an inner surface of the abutment. In one embodiment, the elongated cavity of the dental implant may comprise: a bottom portion that may extend from a bottom end to a middle level and has threads on an inner surface; and a top portion that may extend from the middle level to a top end and receives the abutment; and where an inner diameter of the top portion may be larger than an inner diameter of the bottom portion. Additionally, the abutment may comprise: a bottom structure sitting on a shoulder of the dental implant at the middle level and arranged inside the top portion of the elongated cavity; and a top structure disposed on the bottom structure and extending outwardly of the dental implant in a longitudinal direction. In this embodiment, an outer diameter of the bottom structure of the abutment may be the same as the inner diameter of the access hole of the top structure of the abutment. Further, an inner diameter of the access hole of the bottom structure of the abutment and an inner diameter of the bottom portion of the elongated cavity may be continuous. In one embodiment, the access hole in the bottom structure may include threads on an inner surface to enable threaded engagement of the screw and the threads on an inner surface of the access hole of the bottom structure and threads on an inner surface of the bottom portion of the elongated cavity may be continuous to engage the screw without a gap between the abutment and the dental implant.

In one embodiment of the dental prosthesis, the head of the screw may include a groove and the first end of the bar may be fixedly inserted into the groove. Additionally, the groove of the screw viewed from top may have at least one of: shape of circle, shape of polygon, and shape of star, and a cross section of the first end of the bar have the same shape as the groove. In one embodiment, any cross section of the bar, from the first end to a second end opposite to the first end, may have the same shape as the groove.

In one embodiment, the cover is formed to fill a gap defined by the inner surface of the access hole, the outer surface of the bar, and a top surface of the screw, where the bar includes the first end and a second end opposite to the first end, and ends of the cover are inwardly offset from the first end and the second end of the bar. The embodiment may further comprise a composite material filling a space defined by the inner surface of the access hole and a top surface of the anti-rotation bar. Additionally, the bar, the cover, and the composite may be made of different material from each other.

A method of installing a dental prosthesis according to one embodiment may comprise: inserting a dental implant defining an elongated cavity, inside a jawbone of a patient; placing an abutment defining an access hole, inside a top portion of the elongated cavity of the dental implant to align between the elongated cavity and the access hole; fastening between the dental implant and the abutment by placing a screw inside the elongated cavity and the access hole and engaging the screw with threads on inner surfaces of both of the elongated cavity and the access hole; placing an anti-rotation bar inside the access hole and engaging a first end of the anti-rotation bar with a head of the screw; and filling a composite material on a gap defined by a top surface of the anti-rotation bar and an inner surface of the access hole.

In one embodiment, the anti-rotation bar may comprise: a bar extending in a longitudinal direction and having the first end arranged abutting the head of the screw; and a cover arranged surrounding the bar and disposed in engagement with an inner surface of the abutment.

In one embodiment, the head of the screw may include a groove, and the step of placing the anti-rotation bar includes: fixedly inserting the first end of the bar into the groove. The step of placing the anti-rotation bar may include: forming the cover on an outer surface of the bar to fill a gap defined by the inner surface of the access hole, the outer surface of the bar, and a top surface of the screw. In one embodiment, the bar may include the first end and a second end opposite to the first end, and the step of forming the cover may be performed that ends of the cover are inwardly offset from the first end and the second end of the bar.

BRIEF DESCRIPTION OF THE DRAWINGS

The components in the figures are not necessarily to scale, emphasis instead being placed upon illustrating the principals of the invention. Like reference numerals designate corresponding parts throughout the different views. Embodiments are illustrated by way of example and not limitation in the figures of the accompanying drawings, in which.

DETAILED DESCRIPTION

The description herein is made for the purpose of illustrating the general principles of the embodiments disclosed herein and is not meant to limit the concepts disclosed herein. Further, particular features described herein can be used in combination with other described features in each of the various possible combinations and permutations. Unless otherwise specifically defined herein, all terms are to be given their broadest possible interpretation including meanings implied from the description as well as meanings understood by those skilled in the art and/or as defined in dictionaries, treatises, etc.

In the following description, for purposes of explanation, numerous specific details are set forth in order to provide a thorough understanding of the present invention. It will be apparent, however, to one skilled in the art that the present invention may be practiced without these specific details.

The embodiments are described herein for illustrative purposes and are subject to many variations. It is understood that various omissions and substitutions of equivalents are contemplated as circumstances may suggest or render expedient but are intended to cover the application or implementation without departing from the spirit or the scope of the present invention. Further, it is to be understood that the phraseology and terminology employed herein are for the purpose of the description and should not be regarded as limiting. Any heading utilized within this description is for convenience only and has no legal or limiting effect.

The embodiment of the present disclosure provides a mechanism that may include a solid bar firmly connecting the screw to a composite placed at the outer end of the screw hole, preventing the loosening of the screw and thereby increases the life of the prosthesis. The present disclosure also provides a dental prosthesis that prevents rotation of the screw and therefore prevents disengagement or rotation of the abutment and crown relative to the dental implant.

Figure 1:
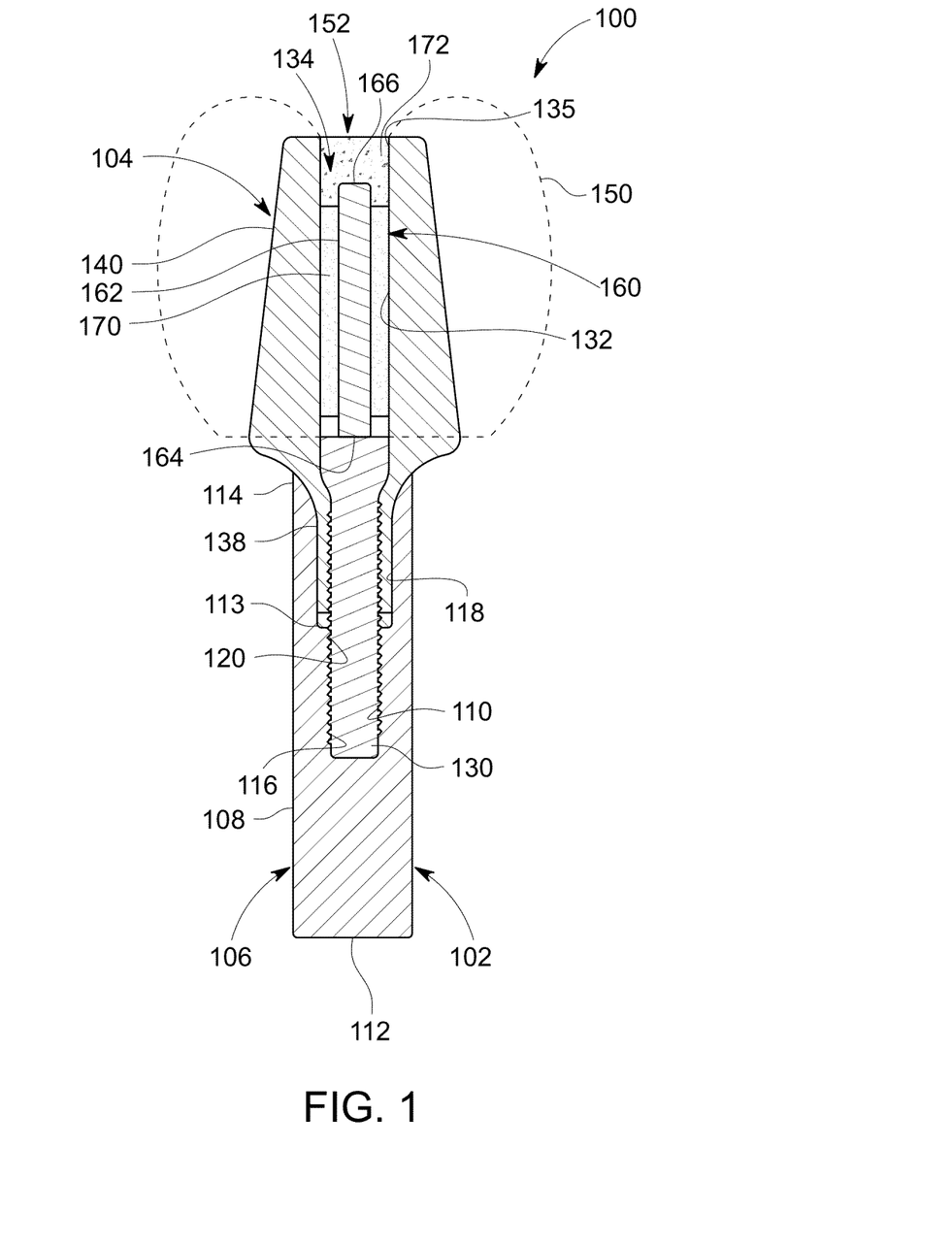
FIG. 1 depicts a sectional front view of a dental prosthesis depicting an anti-rotation bar engaged with a screw that couples an abutment with a dental implant, in accordance with an embodiment of the disclosure.
Figure 2:
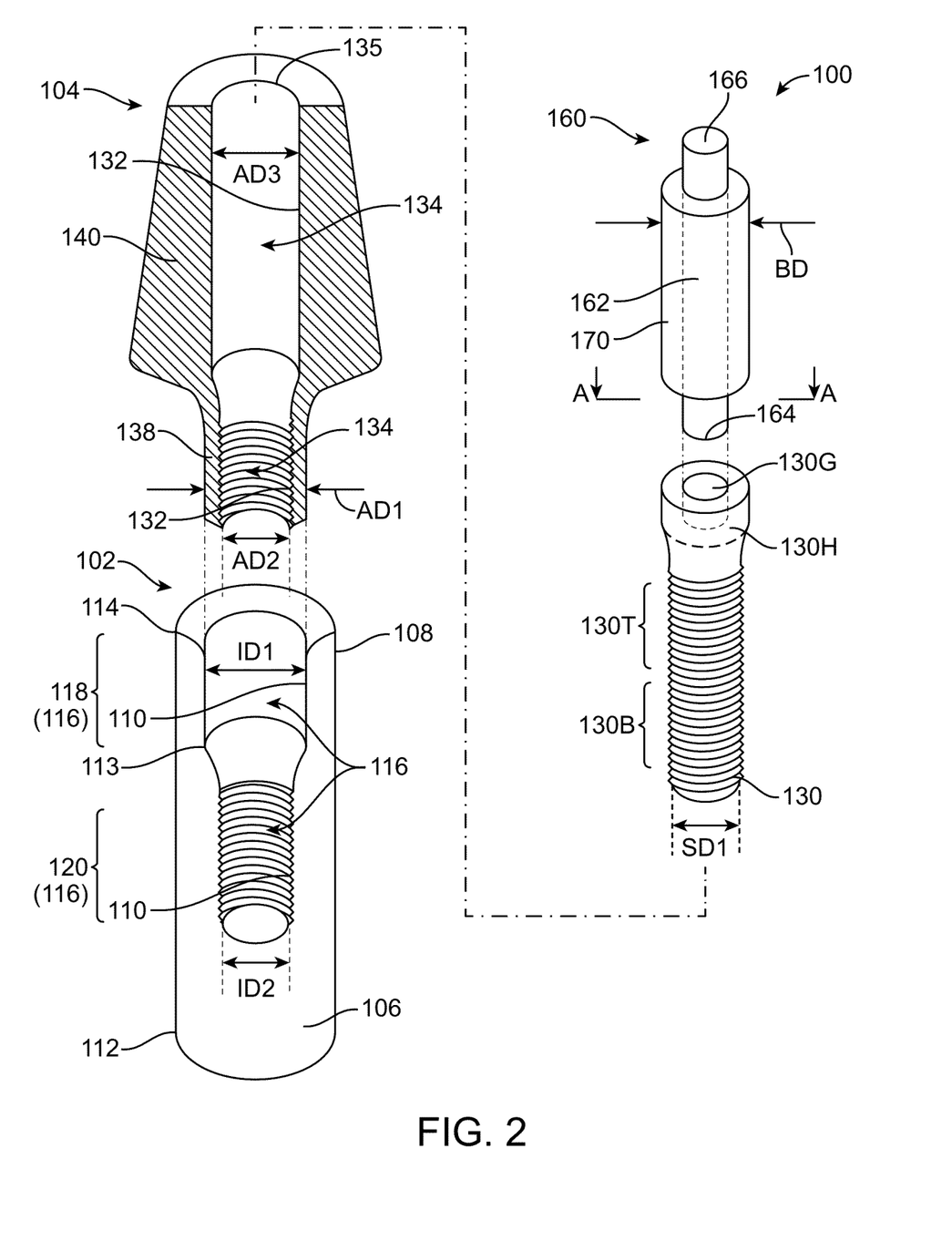
FIG. 2 depicts an exploded perspective view of a dental prosthesis in FIG. 1.

FIG. 1 is a sectional view of a prosthesis system 100 and FIG. 2 is an exploded perspective view of the prosthesis shown in FIG. 1, according to an embodiment of the present disclosure. In FIG. 2, each of a dental implant 102 and an abutment 104 is illustrated to be cut in half in a longitudinal direction and show its cross section to assist the better understanding of the structure.

Figure 3:
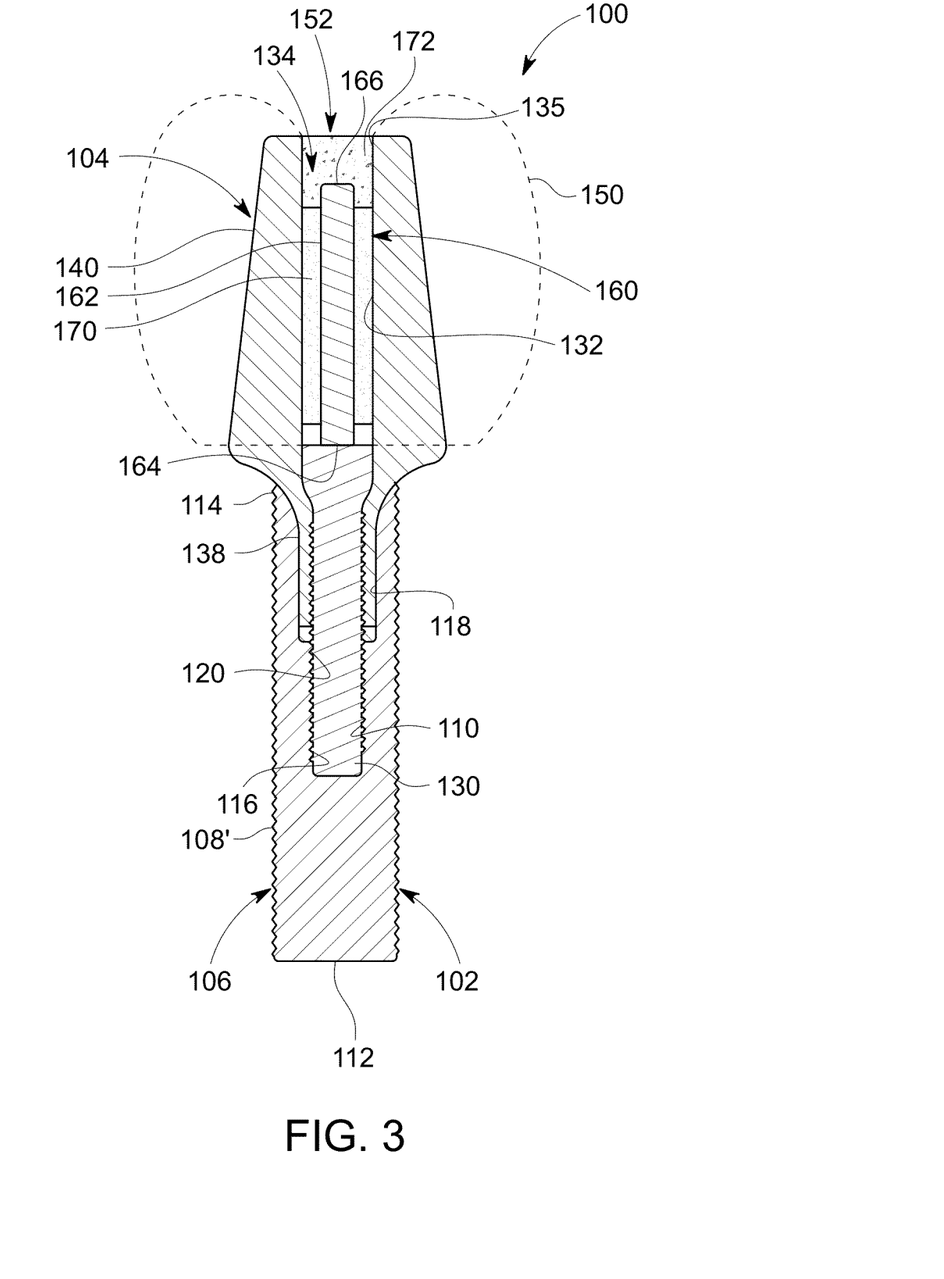
FIG. 3 depicts a sectional front view of a dental prosthesis in accordance with another embodiment of the disclosure.

Referring to FIG. 1, the prosthesis 100 includes a dental implant 102 adapted to be inserted inside a jawbone of a patient and an abutment 104 adapted to be secured to the dental implant 102 and configured to extend outwardly of the jawbone. As shown, the dental implant 102 includes a post 106 having a substantially circular cross-section when seen from a top view and including an outer surface 108, an inner surface 110, a first longitudinal end 112 (i.e., bottom end 112), and a second longitudinal end 114 (i.e., top end 114) arranged opposite to the first end 112. In one embodiment, the outer surface 108 (also shown in FIG. 3 as ref. no. 108') of the post 106 may define threads to enable an easy insertion of the post 106 inside the jawbone and an engagement of the post 106 with the jawbone. Further, the inner surface 110 of the post 106 defines an elongated cavity 116 extending from the top end 114 towards the bottom end 112, and the elongated cavity 116 includes a first portion 118 (top portion 118) extending from the top end 114 towards a middle level 113 positioned between the top end 114 and the bottom end 112, and second portion 120 (bottom portion 120) extending downwardly from the middle level 113 to the bottom end 112. As shown, an inner diameter ID1 of the top portion 118 is relatively larger than an inner diameter ID2 of the bottom portion 120 and is designed so as to receive a bottom portion of the abutment 104 to facilitate an engagement of the abutment 104 with the dental implant 102. The inner diameter ID2 of the bottom portion 120 of the elongated cavity 116 may be sized so as to receive a screw 130, specifically, a lower portion (see ref. no. 130B in FIG. 2) of the screw 130, and includes threads on the inner surface 110 to enable threaded engagement of the screw 130 with the dental implant 102. The screw 130 may be made of metal, carbon fiber, plastic, composite, or other such materials and combinations thereof.

Further, as shown in FIG. 1 and also FIG. 2, the abutment 104 may include a substantially hollow cylindrical structure having an inner surface 132 defining an access hole 134 extending from a top end of the abutment 104 to a bottom end of the abutment 104 to facilitate an insertion of the screw 130 inside the dental implant 102 to secure the abutment 104 with the dental implant 102. As shown in one embodiment, the abutment 104 includes a bottom structure 138 adapted to extend inside the top portion 118 of the elongated cavity 116 and a top structure 140 adapted to extend outwardly of the dental implant 102 in a longitudinal direction. An outer diameter AD1 of the bottom structure 138 is sized so as to snugly fit, or the same as, the inner diameter ID1 of the top portion 118 of the elongated cavity 116 and may be smaller than the outer diameter of the top structure 140 of the abutment 104. Further, an inner diameter AD2 of the bottom structure of the abutment 104 may be sized so as to receive an upper portion 130T of the screw 130, and the inner surface 132 of the bottom structure 138 of the abutment 104 may define threads to enable engagement of the upper portion 130T of the screw 130 with the abutment 104. The inner diameter AD2 of the access hole 134 of the bottom structure 138 of the abutment 104 and the inner diameter ID2 of the bottom portion 120 of the elongated cavity 116 may be continuous in longitudinal direction. In other words, in such embodiments, the inner diameter AD2 of the access hole 134 and the inner diameter ID2 of the bottom portion 120 of the elongated cavity 116 are the same or gradually change without step or discontinuous change in diameter as goes down in longitudinal direction. In this case, the threads on the inner surface 110 of the bottom portion 120 of the elongated cavity 116 and threads on the inner surface 132 of the bottom structure of the abutment 140 may also be formed to be continuous at the middle level 113 to engage the screw 130 without a gap between the abutment 104 and the dental implant 102.

Since, in one embodiment, the screw 130 may engage with the bottom portion 120 of the elongated cavity 116 and the access hole 134 of the bottom structure 138 of the abutment 104 in a state where the bottom structure 138 of the abutment 104 is inserted into the top portion 118 of the elongated cavity 116, the inner diameter ID2 of the bottom portion 120 of the elongated cavity 116 and the inner diameter AD2 of the access hole 134 of the bottom structure 138 of the abutment 104 may match with the outer diameter SD1 of the screw 130.

Figure 4:
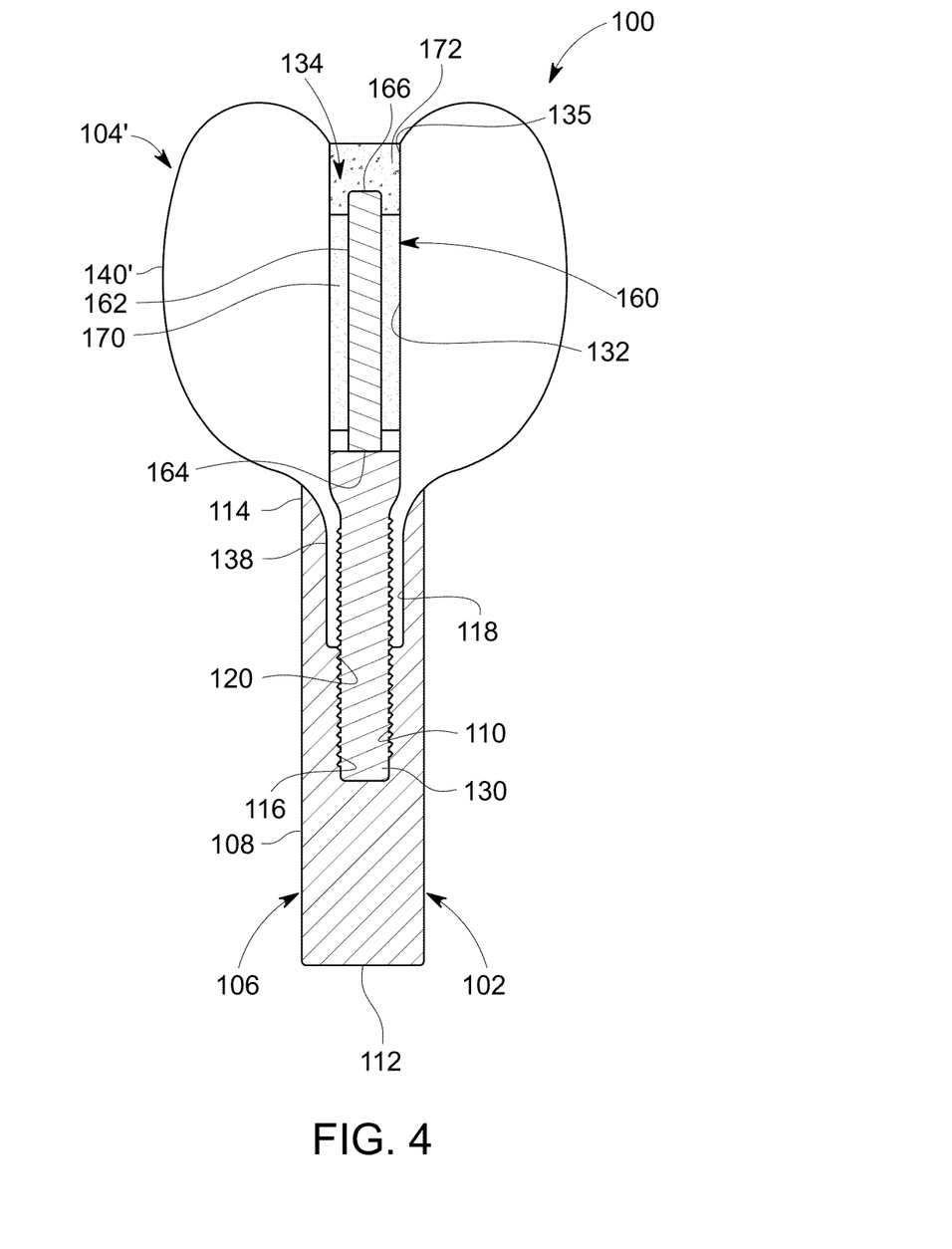
FIG. 4 depicts a sectional front view of a dental prosthesis in accordance with another embodiment of the disclosure.

Moreover, the prosthesis 100 may include a crown 150 arranged surrounding the top structure 140 of the abutment 104. In one embodiment, and referring also to FIG. 4, the crown may be integrally formed with the top structure (ref. no. 140' in FIG. 4) of the abutment (ref. no. 104' in FIG. 4). Additionally, as shown in FIG. 1, it may be appreciated that the crown 150 may be separate from the abutment 104 and fixed to the abutment 104 during implanting of the prosthesis 100 inside the mouth of the patient. As shown, the crown 150 may include a central opening 152 defined at a top surface of the crown 150 and arranged coaxial to the access hole 134 to provide access of the access hole 134 from above. Further, the crown 150 may include a shape of a tooth.

To secure the abutment 104 with the dental implant 102, the prosthesis 100 may include the screw 130 adapted to be inserted inside the elongated cavity 116 of the dental implant 102 and the access hole 134 of the abutment 104 through an opening 135 of the access hole 134 and the central opening 152 of the crown 150. In an assembly of the abutment 104 with the dental implant 102, as shown in FIG. 1 and FIG. 2, the lower portion 130B of the screw 130 may be arranged inside the bottom portion 120 of the elongated cavity 116 of the dental implant 102 and is in threaded engagement with the inner surface 110 of the dental implant 102, while the upper portion 130T of the screw 130 may be arranged inside the bottom structure 138 of the abutment 104 and in threaded engagement with the inner surface 132 of the bottom structure 138 of the abutment 104.

Moreover, to prevent a rotation of the screw 130 relative to the abutment 104 and the dental implant 102, and to restrict the loosening of the screw 130, the embodiments of the present prosthesis 100 include an anti-rotation bar/structure 160 having a substantially cylindrical anchor bar 162. The bar 162 is made to fit a head 130H of the screw 130, which may be different for each different manufacturer. The head 130H of the screw 130 may include a groove 130G that fits with a first end 164 of the bar 162. The bar 162 may be a solid bar and may be made of metal, plastic, composite, or any other material known in the art. The bar 162 may be configured to extend inside the access hole 134 of the abutment 104 such that the first end 164 of the bar 162 abuts the head 130H of the screw 130 and in this embodiment is inserted into the groove 130G formed at the head 130H of the screw 130, while a second end 166 of the bar 162 is arranged inwardly and at a longitudinal offset from the opening 135 of the access hole 134 and the opening 152 of the crown 150. Further in one embodiment, referring to FIG. 7C together, an outer diameter of the bar 162 is selected such that a radial gap G1 exists between the inner surface 132 of the abutment 104 (top structure 140) and an outer surface of the bar 162. Additionally, in some embodiments, the anti-rotation bar 160 may include a cover 170 arranged abutting an outer surface of the bar 162 and surrounding the bar 162. The cover 170 may be formed to fill the radial gap G1 defined by the inner surface 132 of the abutment 104, the outer surface of the bar 162, and a top surface of the screw 130.

Also, it may be appreciated that a length of the cover 170 may be smaller than a length of the bar 162 such that ends of the cover 170 are arranged at an offset from the respective ends of the bar 162. That is, the cover 170 may be formed to fill the radial gap G1 from the head 130H of the screw 130 to a level below the second end 166 of the bar 162. Also, an outer diameter BD of the cover 170 may be selected such that the anti-rotation bar 160 snugly fits the inner diameter AD3 of the access hole 134 and the cover 170 contacts the inner surface 132 of the abutment 104. In some embodiments, the cover 170 may be made of flexible and soft material, such as, but not limited to, rubber, foam, cotton, or any other similar material known in the art. In one embodiment of an assembly of the anti-rotation bar 160, the first end 164 of the bar 162 is arranged abutting a top end, e.g., head 130H of the screw 130 and fitting the groove 130G of the screw 130. Further, in the assembly, referring to FIG. 7C again, a composite material 172 may be a composite filling and be inserted inside the gap G2 between the inner surface 132 of the abutment 104 and the second end 166 of the anti-rotation bar 160 to seal the access hole 34 of the abutment 104 and fixedly lock or engage the bar 162 in place with the screw 130 and the abutment 104, thereby preventing the movement of the bar 162 and the rotation of the screw 130 relative to the dental implant 102 and the abutment 104. In some embodiments, as mentioned above, the crown 150 may be integrally formed with the top structure (ref. no. 140' in FIG. 4) of the abutment (ref. no. 104' in FIG. 4). In this case, a composite material 172 may be inserted inside the gap G2 to seal the access hole 134 of the integration of the abutment 104 and the crown 150 and fixedly engage the bar 162 in place with the screw 130 and the integration of the abutment 104 and the crown 150. This structure may prevent the movement of the bar 162 and the rotation of the screw 130 relative to the dental implant 102 and the integration of the abutment 104 and the crown 150. In some embodiments, the composite material 172 may be a composite, cement, another firm material, or a combination thereof.

Figure 5A:
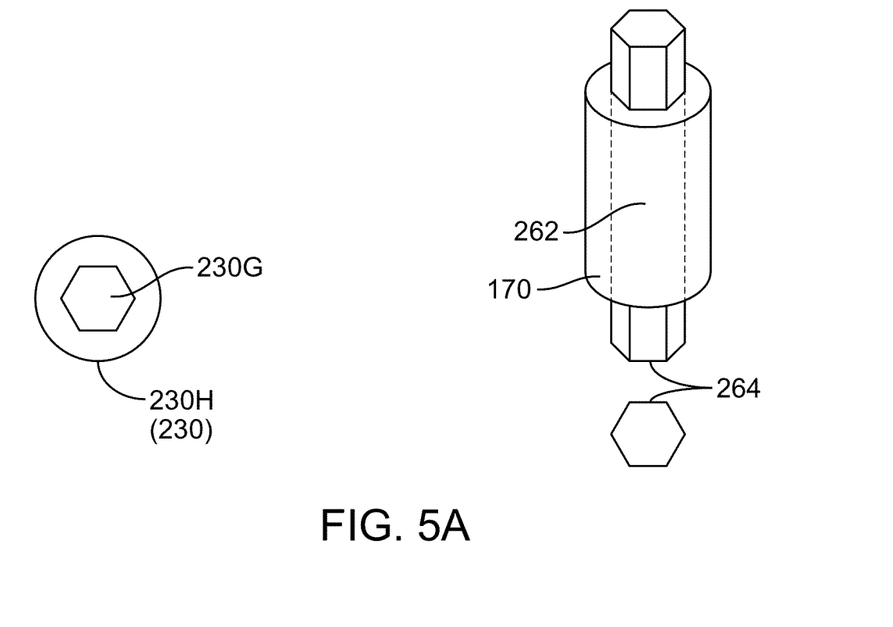
FIG. 5A depicts a top view of a screw, a cross sectional view of a bar cut along A-A line in FIG. 2.
Figure 5B:
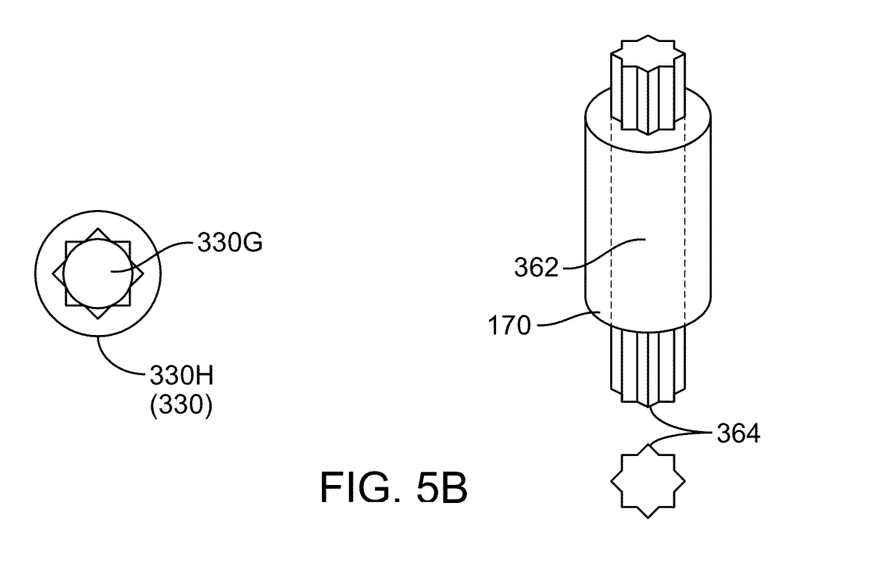
FIG. 5B depicts a perspective view of an anti-rotation bar of a dental prosthesis in accordance with other embodiments of the disclosure.

In FIG. 2, the shapes of the groove 130G of the screw 130 and the bar 160 fitting in the groove 130G are illustrated as circle but are not limited thereto. In some embodiments, referring to FIGS. 5A and 5B, the groove 230G of the head 230H of the screw 230 and the bar 262 fitting in the groove 230G may have a shape of polygon 264, such as triangle, square, rectangle, pentagon, hexagon, octagon, and others, in their cross sections. In some embodiments, the groove 330G of the head 330H of the screw 330 and the bar 362 fitting in the groove 330G may have a shape of star 364 with a various number of vertices, in their cross sections. The structure and shapes of the bar 162, 262, 362 are not limited to embodiments described above and may vary. FIGS. 5A and 5B illustrate any cross section of the bar 262, 362, from the first end to the second end, has the same shape as the groove 230G, 330G, but only certain portions, including the first end 164, 264, 364, of the bar 262, 362 may have the same shape as the groove 230G, 330G.

Accordingly, in one embodiment of the assembly process, the anti-rotation bar 160 with its associated cover 170 is measured and cut to fit into the access hole 134 of the abutment 104 and end below the opening 135 of the access hole 134 and the opening 152 of the crown 150. The anti-rotation bar 160 engages the screw 130 at one end, the first end 164 of the bar 162, and ends just a few millimeters short of the opening 135 of the access hole 134 and outer surface of the crown 150 at the other end, depending on the circumstances. At this point, the composite restoration material 172 may be placed on the other end of the anti-rotation bar 160. As the composite restoration material 172 contacts and engages the anti-rotation bar 160, it indirectly engages the screw 130 and prevents the screw 130 from turning and loosening. In one specific example, about 2 millimeters of the outer soft cover 170 at each end of the anti-rotation bar 160 may be removed to expose both ends of the bar 162 without the cover 170. This allows the bar 162 to fit into the screw 130 in one end and lock into the final composite restoration material 172 at the other end. The cover 170 provides the bar 162 with friction and support against the inner walls of the access hole 134 in which the bar 162 is placed. The friction and support are to keep the bar 162 in place while the user, for example, a dentist, is trying to connect the first end 164 of the bar 162 to the screw 130 and the second end 166 of the bar 162 to the stable composite restoration material 172. Once the bar 162 is stabilized at both ends 164, 166, and the composite 172 is shaped and adjusted, the screw 130 may be anchored and stabilized, thereby safely keeping the prosthesis 100 in place.

In some embodiments, an instrument or tool (not shown) may be used to install the prosthesis 100. The tool may be fit at either end of the prosthesis 100. The tool may have a same or similar dimensions and/or shape as the screw 130 that holds the dental implant 102 and is anchored by the prosthesis 100. The tool may have a same or similar shape and/or size as a cross section of the prosthesis 100. In some embodiments, the tool may have an appearance of a small screwdriver where the top is configured to engage and fit the prosthesis 100 and place the prosthesis 100 in a desired position. Other tool dimensions, sizes, and/or shapes for installing the prosthesis 100 are possible and contemplated.

In some embodiments, the dimensions of the prosthesis 100 may vary based on a number of sides of the implant screw 130. In some embodiments, the implant screw 130 may have four sides. In other embodiments, the implant screw 130 may have six sides. Various shapes of bars 162 and screws 130 may be used to manufacture and/or install the disclosed prosthesis 100. For the cover 170, various resilient materials may be used to cover a middle portion, the outer surface of the bar 162 of the prosthesis 100.

Figure 6:
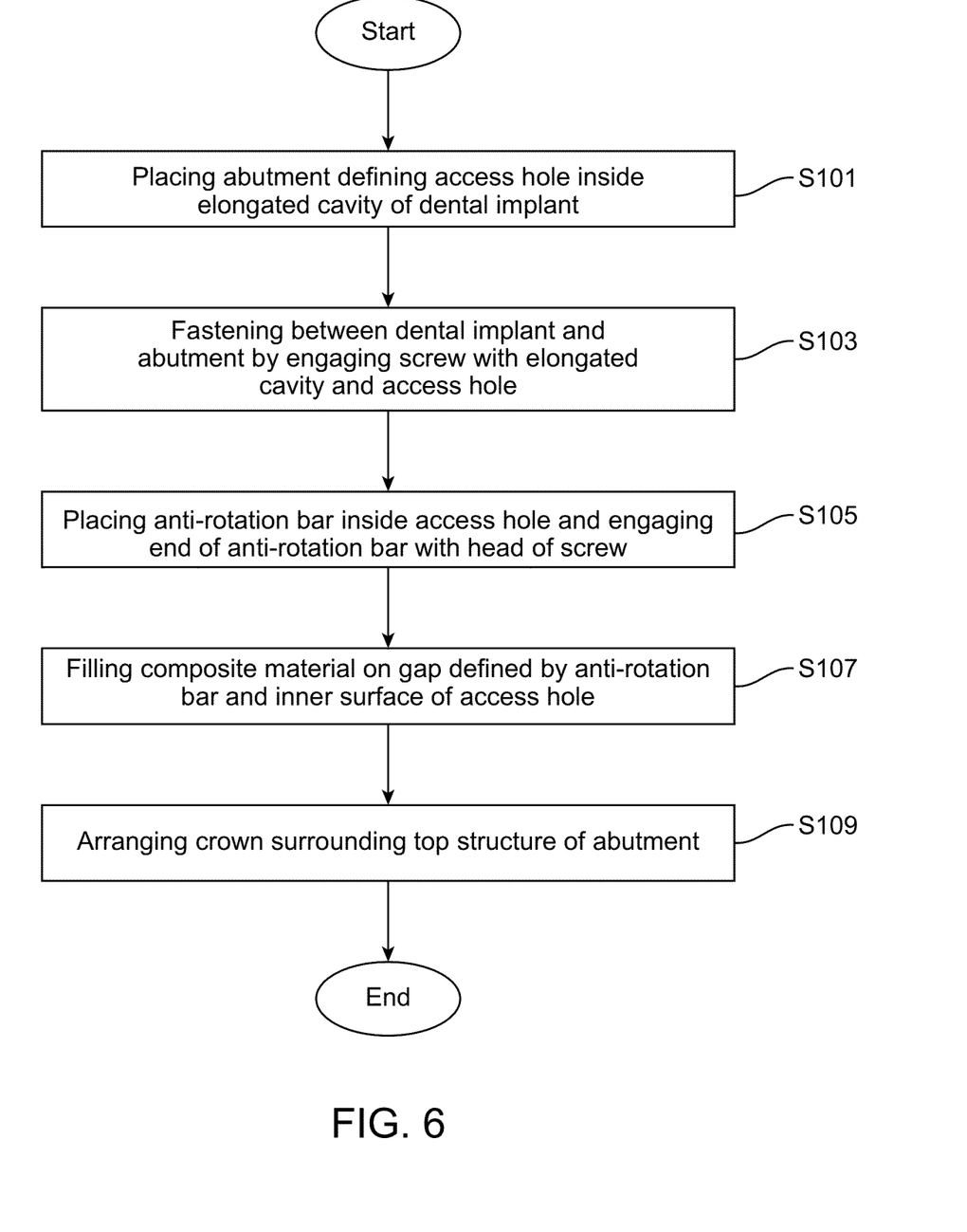
FIG. 6 depicts a flowchart of an installation process of a dental prosthesis in accordance with an embodiment of the disclosure.

FIG. 6 depicts a flowchart of a method of installing a dental prosthesis, and FIGS. 7A to 7E depict each step of the installation process, in accordance with an embodiment of the disclosure.

Figure 7A:
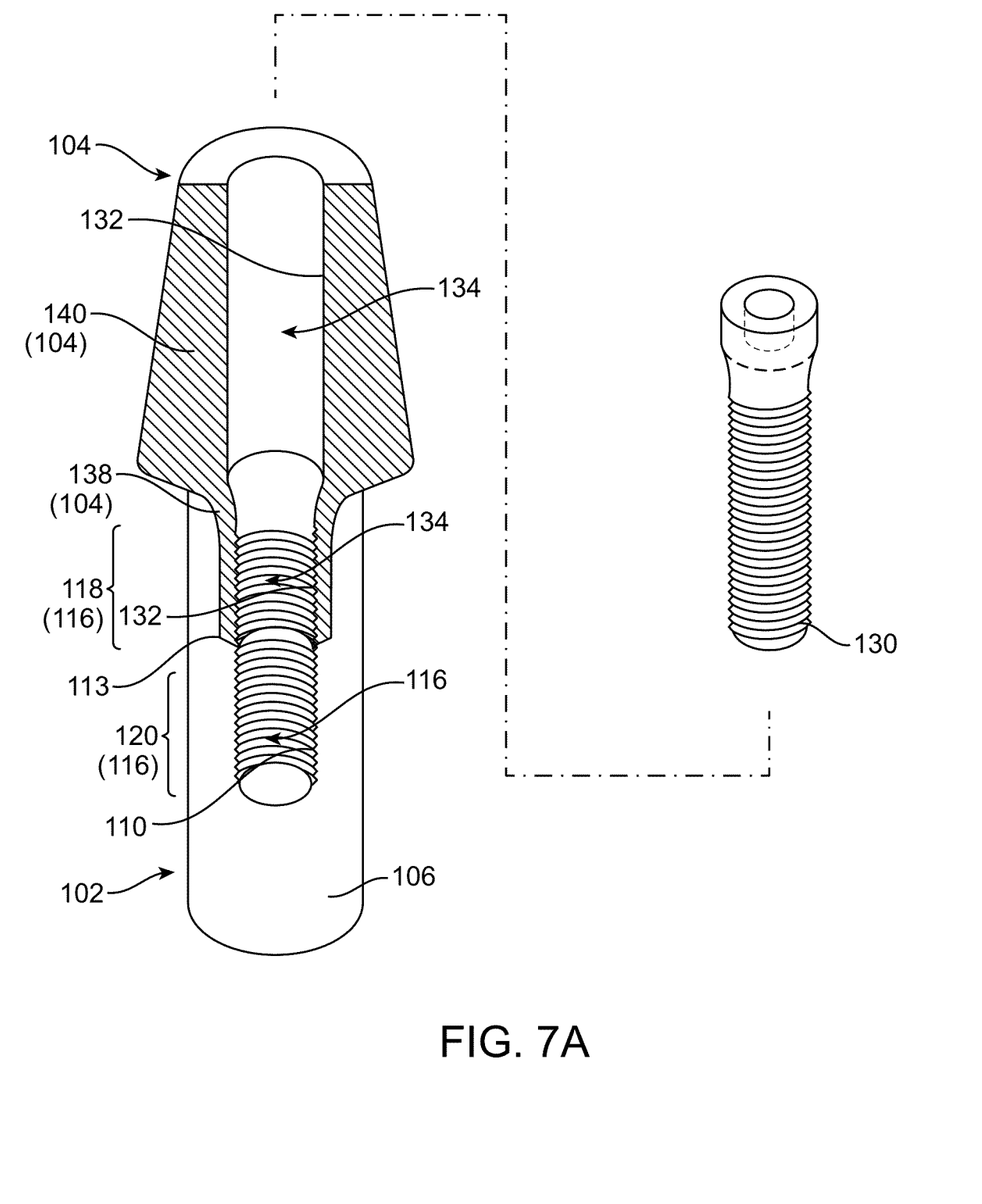
FIG. 7A depicts a step of an installation process of a dental prosthesis in accordance with an embodiment of the disclosure.

Referring to FIGS. 6 and 7A, after a dental implant 102 is inserted inside a jawbone of a patient, the bottom structure 138 of an abutment 104 is placed inside a first portion 118, top portion, of an elongated cavity 116 of the dental implant 102, S101. The bottom structure 138 of the abutment 104 may sit on a shoulder at a middle level 113 of the dental implant 102, and the access hole 134 of the abutment 104 and the bottom portion 120 of the elongated cavity 116 of the dental implant 102 are aligned to allow a screw 130 to be received there through.

Figure 7B:
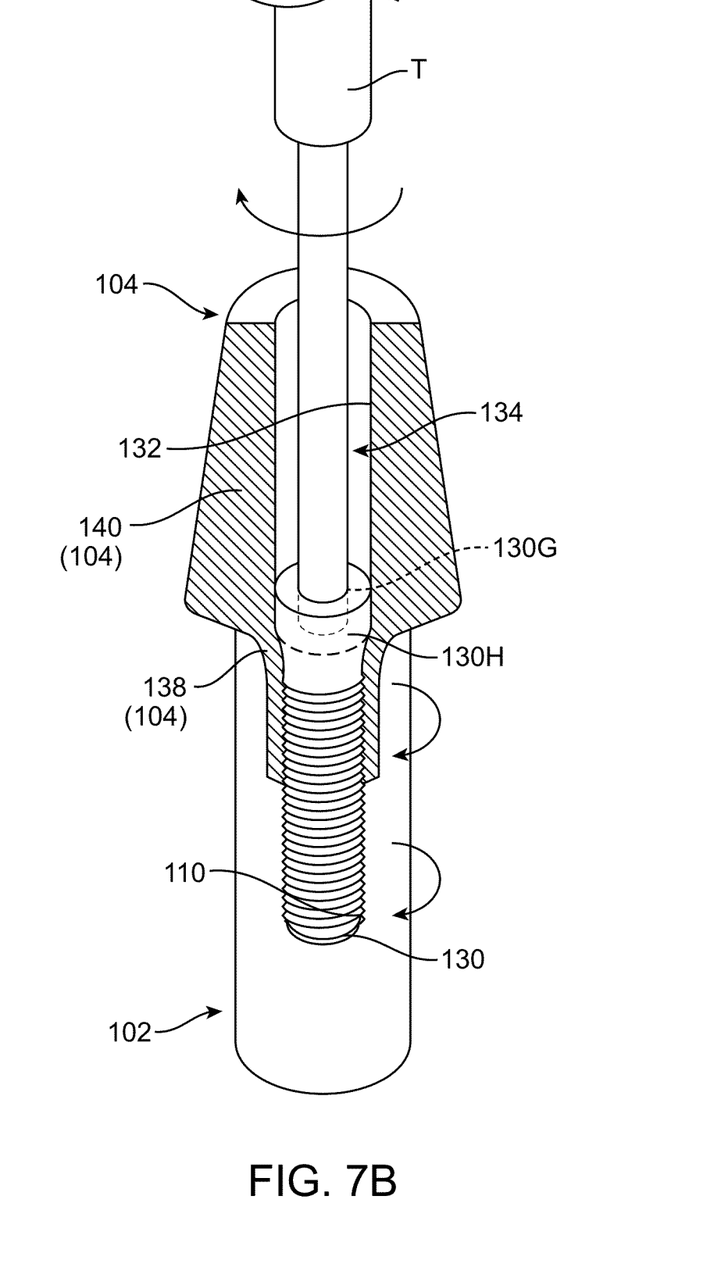
FIG. 7B depicts an additional step of an installation process of a dental prosthesis in accordance with an embodiment of the disclosure.

In one embodiment, referring to FIGS. 6 and 7B, the dental implant 102 and the abutment 104 are fastened to each other by the engagement of a screw 130 and each of the elongated cavity 116 and the access hole 134, S103. Specifically, in one embodiment, the screw 130 is inserted through the access hole 134 and the elongated cavity 116 and screwed to the threads of the inner surface 132 of the abutment 140 and threads of the inner surface 110 of the bottom portion 120 of the elongated cavity 116 of the dental implant 102 by using a tool T, or instrument. The tool T may be fit at a groove 130G of a head 130H of the screw 130 to allow the screw 130 to be controlled and engaged with the threads inside the access hole 134 and the elongated cavity 116 by the tool T. In some embodiments, the tool T may be a small screwdriver where the tip is configured to engage and fit the groove 130G.

Figure 7C:
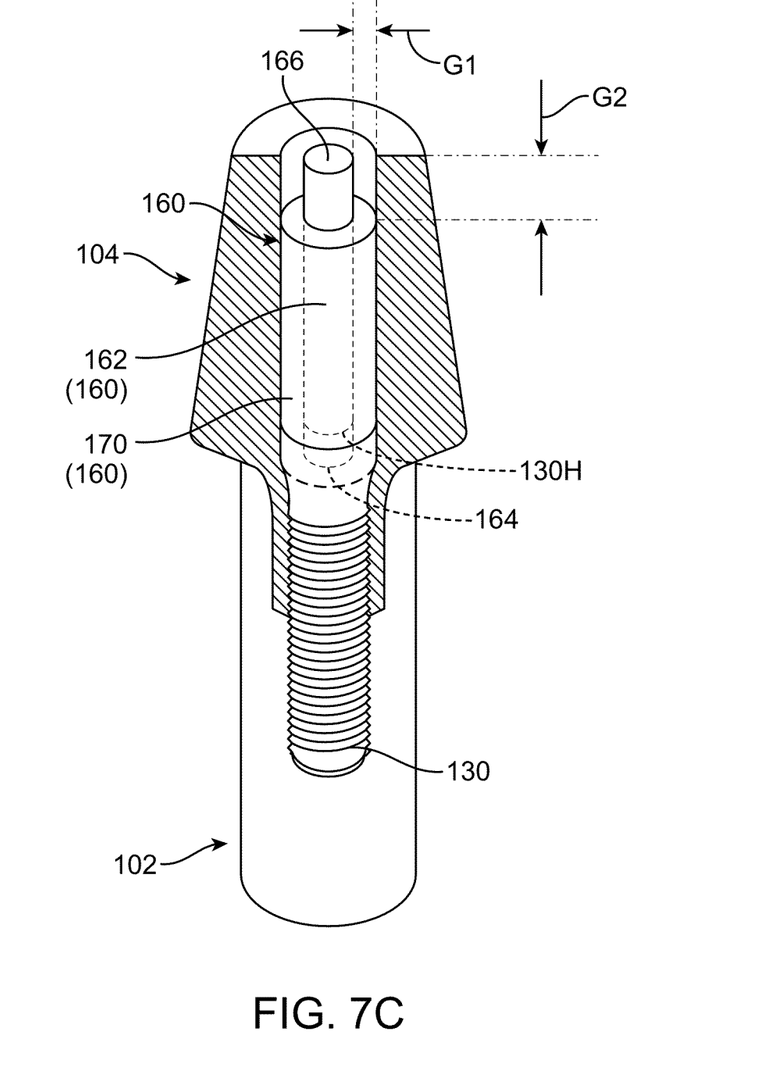
FIG. 7C depicts an additional step of an installation process of a dental prosthesis in accordance with an embodiment of the disclosure.

After the step S103 of screwing, referring to FIGS. 6 and 7C, on the head 130H of the screw 130, an anti-rotation bar 160 may be inserted in the access hole 134, S105. A first end 164 of a bar 162 of the anti-rotation bar 160 is engaged with the groove 130G of the head 130H of the screw 130, and a cover 170 surrounding the bar 162 may fill the radial gap G1 between the inner surface 132 of the abutment 104 and the outer surface of the bar 162. The anti-rotation bar 160 can hold down the screw 130, thereby preventing it from loosening and/or turning.

Figure 7D:
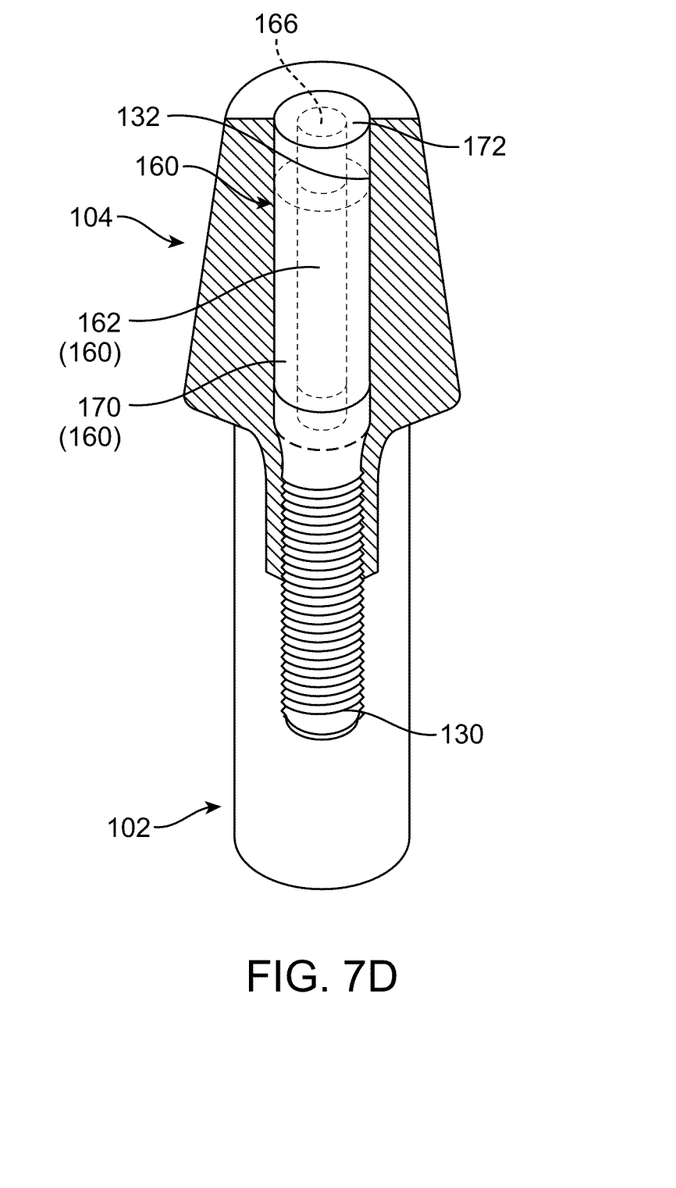
FIG. 7D depicts an additional step of an installation process of a dental prosthesis in accordance with an embodiment of the disclosure.

Then, referring to FIGS. 6 and 7D, a composite material 172 may be filled inside a gap G2 defined by the inner surface 132 of the abutment 104 and the second end 166 of the anti-rotation bar 160 to fixedly engage the bar 162 with the screw 130 and the abutment 104, S107. With this step, the anti-rotation bar 160 may be connected to the screw 130 at one end and to the composite material 172 at the other end. This structure may be configured to prevent the rotation of the screw 130 relative to the dental implant 102 and the abutment 104.

Figure 7E:
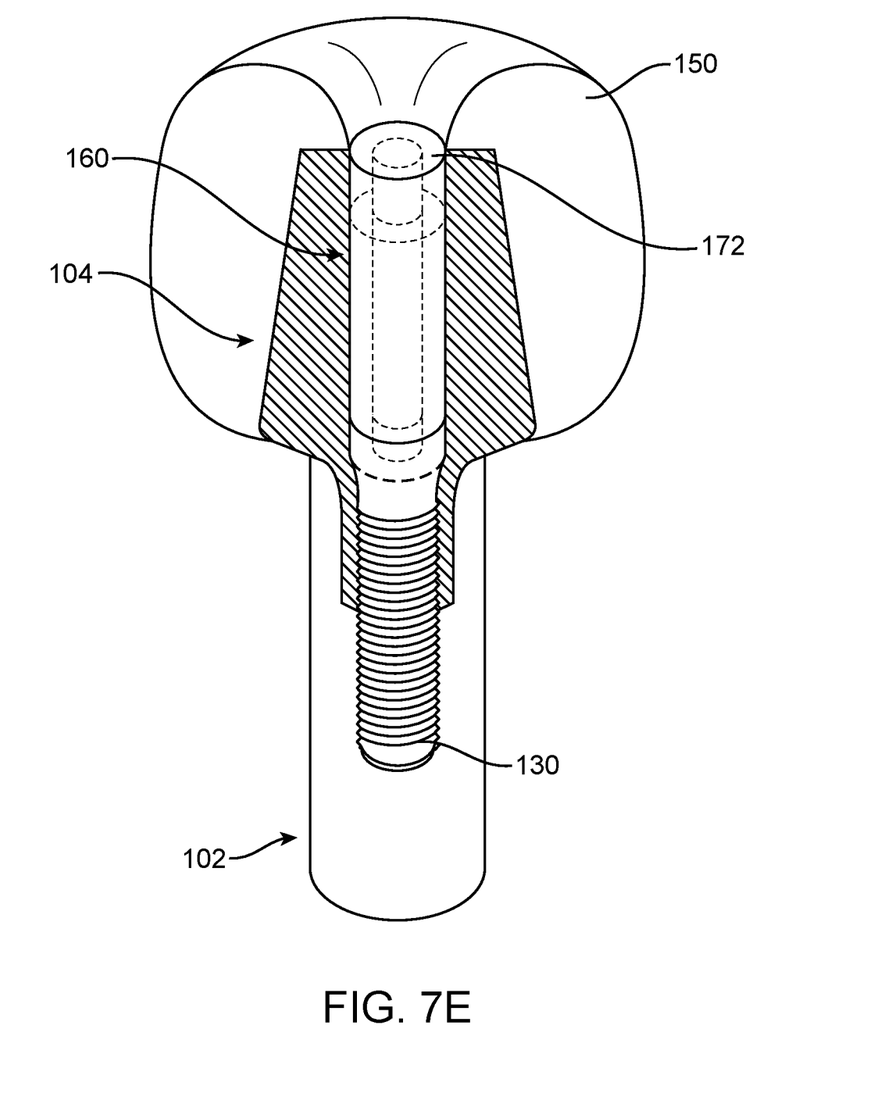
FIG. 7E depicts an additional step of an installation process of a dental prosthesis in accordance with an embodiment of the disclosure.

After the step S107 of filling the composite material 172, referring to FIGS. 6 and 7E, a crown 150 is arranged surrounding the top structure 140 of the abutment 104, S109.

It is contemplated that various combinations and/or sub-combinations of the specific features and aspects of the above embodiments may be made and still fall within the scope of the invention. Accordingly, it should be understood that various features and aspects of the disclosed embodiments may be combined with or substituted for one another in order to form varying modes of the disclosed invention. Further, it is intended that the scope of the present invention is herein disclosed by way of examples and should not be limited by the particular disclosed embodiments described above.

What is claimed is:

1. A dental prosthesis system, comprising:
 a dental implant adapted to be inserted inside a jawbone and defining an elongated cavity inside;
 an abutment configured to be partially inserted inside the elongated cavity and defining an access hole aligned with the elongated cavity;
 a screw configured to be inserted inside the elongated cavity and the access hole and coupling the abutment with the dental implant;
 an anti-rotation bar disposed inside the access hole and having a first end engaged with a head of the screw and an outer surface disposed in contact with the abutment, wherein the anti-rotation bar restricts a rotation of the screw inside the access hole, wherein the anti-rotation bar comprises a bar extending in a longitudinal direction and having the first end arranged abutting the head of the screw; and
 a cover arranged surrounding the bar and disposed in engagement with an inner surface of the abutment, wherein the cover is formed to fill a gap defined by an inner surface of the access hole, an outer surface of the bar, and a top surface of the screw.

2. The dental prosthesis of claim 1, wherein the elongated cavity of the dental implant comprises:
 a bottom portion that extends from a bottom end to a middle level and has threads on an inner surface; and
 a top portion that extends from the middle level to a top end and receives the abutment;
 wherein an inner diameter of the top portion is larger than an inner diameter of the bottom portion.

3. The dental prosthesis of claim 2, wherein the abutment comprises:
 a bottom structure sitting on a shoulder of the dental implant at the middle level and arranged inside the top portion of the elongated cavity; and
 a top structure disposed on the bottom structure and extending outwardly of the dental implant in a longitudinal direction.

4. The dental prosthesis of claim 3, wherein an outer diameter of the bottom structure of the abutment is the same as the inner diameter of the top portion of the elongated cavity.

5. The dental prosthesis of claim 4, wherein an inner diameter of the access hole of the bottom structure of the abutment and an inner diameter of the bottom portion of the elongated cavity are continuous.

6. The dental prosthesis of claim 5, wherein the access hole in the bottom structure includes threads on an inner surface to enable threaded engagement of the screw.

7. The dental prosthesis of claim 6, wherein the threads on the inner surface of the access hole of the bottom structure and the threads on the inner surface of the bottom portion of the elongated cavity are continuous to engage the screw without a gap between the abutment and the dental implant.

8. The dental prosthesis of claim 1, wherein the head of the screw includes a groove and a first end of the bar is fixedly inserted into the groove.

9. The dental prosthesis of claim 8, wherein the groove of the screw viewed from top has at least one of: shape of circle, shape of polygon, and shape of star, and a cross section of the first end of the bar has the same shape as the groove.

10. The dental prosthesis of claim 9, wherein any cross section of the bar, from the first end to a second end opposite to the first end, has the same shape as the groove.

11. The dental prosthesis of claim 1, wherein the bar includes the first end and a second end opposite to the first end, and ends of the cover are inwardly offset from the first end and the second end of the bar.

12. The dental prosthesis of claim 11, further comprising a composite material filling a space defined by the inner surface of the access hole and a top surface of the anti-rotation bar.

13. The dental prosthesis of claim 12, wherein the bar, the cover, and the composite material are made of different material from each other.

14. A method of installing a dental prosthesis, the method comprising:
 inserting a dental implant defining an elongated cavity, inside a jawbone of a patient;
 placing an abutment defining an access hole, inside a top portion of the elongated cavity of the dental implant to align between the elongated cavity and the access hole;
 fastening between the dental implant and the abutment by placing a screw inside the elongated cavity and the access hole and engaging the screw with threads on inner surfaces of both of the elongated cavity and the access hole;
 placing an anti-rotation bar inside the access hole and engaging a first end of the anti-rotation bar with a head of the screw, the anti-rotation bar comprising a bar extending in a longitudinal direction and having the first end arranged abutting the head of the screw, and a cover arranged surrounding the bar and disposed in engagement with an inner surface of the abutment;
 forming the cover on an outer surface of the bar to fill a gap defined by an inner surface of the access hole, an outer surface of the bar, and a top surface of the screw; and
 filling a composite material on a gap defined by a top surface of the anti-rotation bar and an inner surface of the access hole.

15. The method of claim 14, wherein the head of the screw includes a groove, and the step of placing the anti-rotation bar includes: fixedly inserting the first end of the bar into the groove.

16. The dental prosthesis of claim 14, wherein the bar includes the first end and a second end opposite to the first end, and the step of forming the cover is performed that ends of the cover are inwardly offset from the first end and the second end of the bar.

* * * * *